Nov. 12, 1940.     R. SHIPMAN     2,221,725
SPINDLE AND MOUNTING
Filed Nov. 18, 1938     2 Sheets-Sheet 2
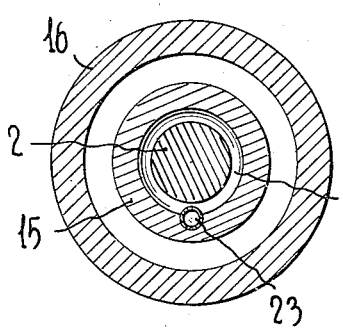
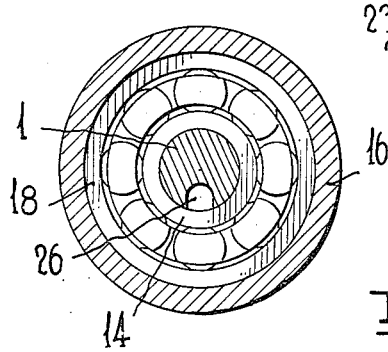
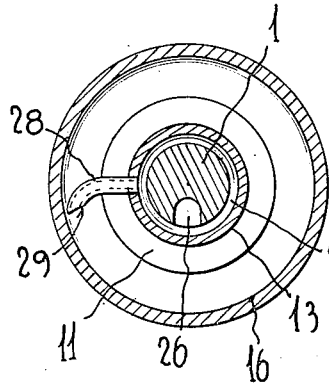
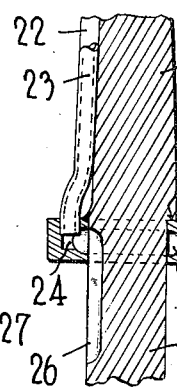
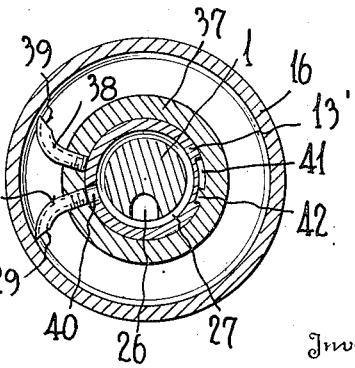
Inventor
Ralph Shipman,
By Stone, Boyden & Mack,
Attorneys.

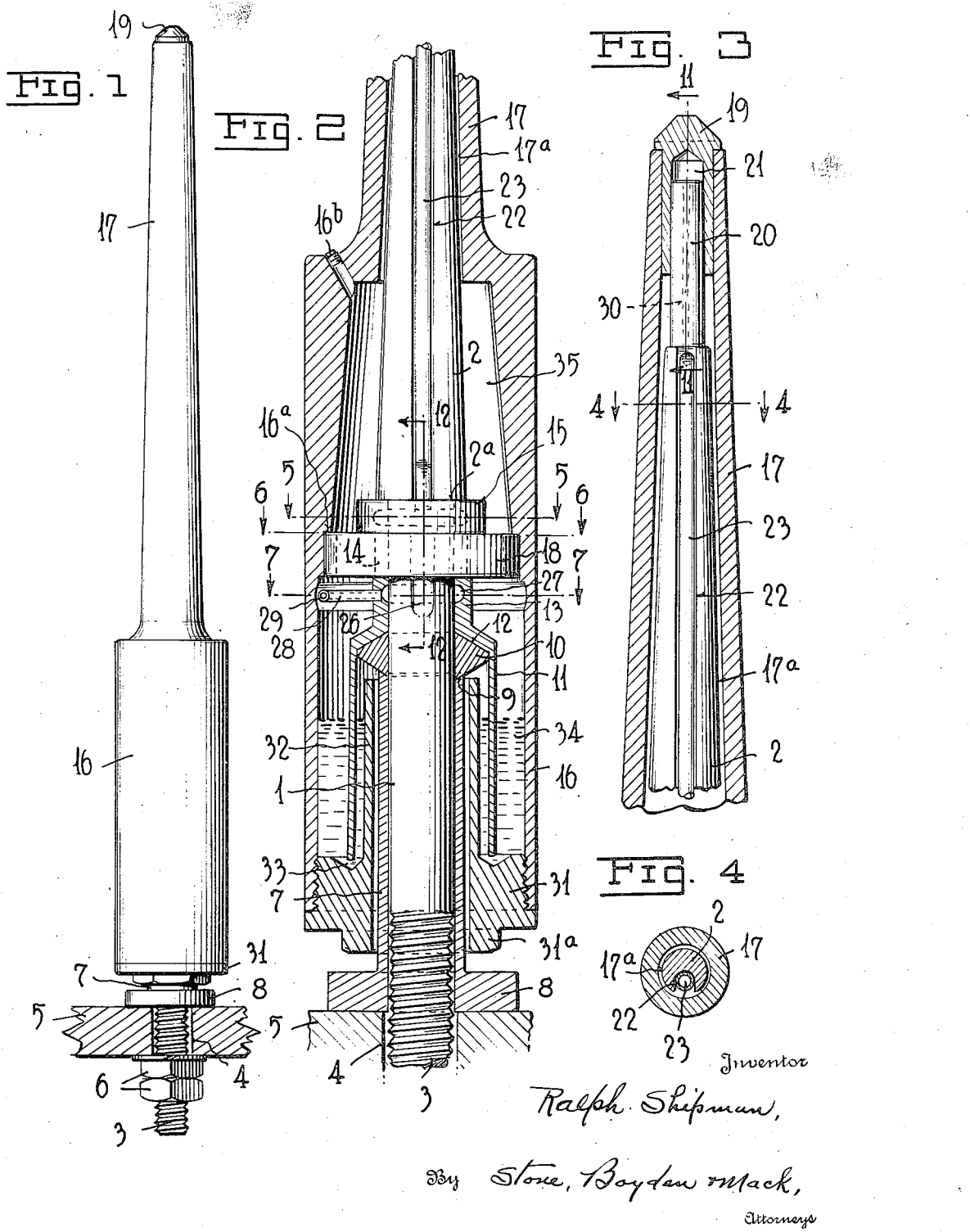

Patented Nov. 12, 1940

2,221,725

UNITED STATES PATENT OFFICE 2,221,725

SPINDLE AND MOUNTING

Ralph Shipman, Sunbury, Pa.

Application November 18, 1938, Serial No. 241,262

20 Claims. (Cl. 308—169)

This invention relates to spindles and more particularly to an improved mounting for spindles such as are employed in the spinning industry.

One of the objects of the invention is to devise a spindle which shall be capable of carrying a heavier package than heretofore, and which shall be capable of operating at high speeds such as twelve to fifteen thousand revolutions per minute, without vibration.

Another object is to provide an improved means for forcing oil to the spindle bearings in order to reduce friction to a minimum and to enable them to operate continuously over a long period of time without excessive wear.

A still further object is to so design the spindle structure that the parts may be cheaply manufactured and easily assembled, and so that the necessity for great precision in the machining of the parts is obviated.

Other objects and advantages will be apparent from the following description.

In order to enable the invention to be readily understood, reference is had to the accompanying drawings forming part of this specification, and in which—

Fig. 1 is a side elevation of my improved spindle structure complete, parts being shown in section;

Fig. 2 is a longitudinal section on an enlarged scale through one end of the spindle structure, parts being shown in elevation;

Fig. 3 is a similar view of the other end of the spindle structure;

Fig. 4 is a transverse section on the line 4—4 of Fig. 3;

Fig. 5 is a transverse section on the line 5—5 of Fig. 2, looking in the direction of the arrows;

Fig. 6 is a transverse section substantially on the line 6—6 of Fig. 2, looking in the direction of the arrows;

Fig. 7 is a transverse section substantially on the line 7—7 of Fig. 2, looking in the direction of the arrows;

Fig. 8 is a side elevation of a modified form of closure cap shown at the bottom of the spindle structure illustrated in Fig. 2;

Fig. 9 is a transverse section on the line 9—9 of Fig. 8;

Fig. 10 is a view similar to Fig. 7, but showing a modified arrangement;

Fig. 11 is a longitudinal section on the line 11—11 of Fig. 3, looking in the direction of the arrows; and Fig 12 is a section on the line 12—12 of Fig. 2, looking in the direction of the arrows.

Referring to the drawings in detail, my improved spindle structure comprises a fixed or dead spindle having a lower cylindrical portion 1 and an upper tapered portion 2. The extreme lower end of the portion 1 is threaded as at 3, and is adapted to pass through and be received in an opening 4 in a suitable bracket or support 5. It is clamped in position by means of nut 6 threaded on the portion 3.

Surrounding the lower end portion 1 of the fixed spindle is a sleeve 7 having at its lower end a relatively wide and heavy base flange 8 adapted to rest upon the support 5. The upper end of the sleeve 7 is preferably beveled, as at 9, and engages the lower face of a beveled packing washer 10 which loosely surrounds the shank 1. A bell-shaped sleeve member 11 fits over the shank 1 and engages the upper beveled surface 12 of the packing washer 10. This sleeve member has a neck portion 13 at its upper end which, when the parts are assembled, is adapted to bear against and support the inner raceway 14 of an anti-friction bearing assembly.

At the juncture of the cylindrical and tapered portions of the inner or fixed spindle is a shoulder 2ª, and against this shoulder bears a washer 15 which fits around the cylindrical shank above the said anti-friction bearing assembly. This washer bears against the upper side of the inner raceway 14.

Enclosing and mounted to rotate upon the fixed or dead spindle above described, is a hollow outer live spindle comprising a lower cylindrical portion 16 and an upper tapered portion 17. Within the cylindrical portion 16 is formed a seat in which is received, with a pressed fit, the outer raceway 18 of the said anti-friction bearing assembly. At the upper side of this seat is an overhanging shoulder 16ª engaging the edge of the outer raceway 18 so as to sustain the axial thrust upon the hollow spindle.

The upper end of the outer hollow spindle 17 is closed by means of a cap bearing 19, preferably formed of bronze or the like, and this fits snugly a cylindrical journal 20 formed at the upper end of the tapered portion 2 of the fixed spindle, as clearly shown in Fig. 3. It will be noted that a space 21 is formed between the end of the journal 20 and the closed end of the cap 19, this space constituting a chamber for receiving oil as hereinafter described. By virtue of this space or clearance, moreover, it is unnecessary to accurately limit the length of the journal 20, since obviously a considerable variation in the length of this journal would be immaterial. This makes for cheapness of construction and ease in assembly.

Extending longitudinally of the tapered portion 2 of the fixed spindle is a groove 22. This extends from the washer 15 upwardly to a point adjacent the lower end of the journal 20 (see Fig. 11), and from this point an axial bore 30 is formed longitudinally through the journal 20.

A tube 23 lies in the groove 22 so that it is flush with the surface of the spindle throughout the greater portion of its length. At its lower end, however, the tube is bent slightly outward as shown in Fig. 12, and its end is set into a socket 24 formed in the washer 15. This socket communicates with a second and shorter groove 26, extending downwardly from the washer 15 to a point below the anti-friction bearing assembly. In order to facilitate this communication, and to avoid the necessity of precision in assembly, the socket 24 preferably merges into an annular groove or recess 25 formed on the inside of the washer 15 as clearly shown in Fig. 12.

Formed on the inside of the neck 13 of the bell-shaped sleeve member 11 is a similar annular groove 27 (see Fig. 2) and communicating with this groove is a scoop pipe 28 which is carried by and extends substantially radially from the neck 13. The outer end of this scoop pipe or skimmer is bent laterally as indicated at 29 so that its open end lies in a substantially radial plane. Such open end is disposed closely adjacent the inner wall of the cylindrical portion 16 of the hollow spindle, and in fact, as shown in Fig. 2, a shallow groove is preferably formed in such wall adjacent the scoop pipe.

The tube 23 communicates at its upper end with the bore 30 as shown in Fig. 11.

The lower part of the whirl or cylindrical portion 16 of the hollow spindle constitutes an oil reservoir and is closed by means of a cap 31, preferably formed at its lower end with a nut 31ª so that it may be turned with a wrench. Projecting upwardly from the cap 31 is an annular sleeve or wall 32 spaced from the fixed sleeve 7 so as to permit free rotation of the hollow spindle. A clearance is also provided between the lower end of the bell-shaped sleeve member 11 and the cap 31, as shown at 33 in Fig. 2.

As indicated at 34, oil is placed in this reservoir up to some such level as shown in the drawing, this level being below the top of the annular wall 32, and also well below the scoop pipe 28.

It will be noted that the interior wall of the hollow spindle 17 is tapered to correspond with the taper of the fixed spindle 2, so that an annular space 17ª is provided between the two spindles through the greater part of their length, this annular space increasing progressively in diameter from the top downwardly. The upper part of the interior of the whirl 16, above the anti-friction bearing assembly, is preferably tapered as shown at 35 in Fig. 2 and communicates with the lower end of the annular space 17ª. A filling opening, closed by a plug 16ᵇ, is provided at the upper end of the whirl.

In assembling the parts of my improved spindle structure, it will be seen that, by screwing up the nuts 6, the washer 15, the anti-friction bearing assembly, the neck 13 of the bell-shaped member 11, the packing nut 10, and the supporting sleeve 7 and base 8 are clamped between the support 5 and the shoulder 2ª of the inner fixed spindle. All other parts are free. The packing washer 10 makes a tight seal so as to prevent leakage of oil downwardly from the groove 27 along the shank 1. It will be particularly observed, however, that there is no packing and no frictional contact between relatively rotatable parts. The packing washer 10 is between two fixed parts.

It will be understood that my improved spindles are mounted in such position that a wide flat driving belt contacts the cylindrical whirl portion 16, whereby a number of spindles are driven by such belt in a well known manner.

As soon as the spindle begins to rotate, the oil 34 is caused, by centrifugal force, to rise up along the inner wall of the reservoir until it reaches the scoop pipe 28. The rotation of the body of oil inside of the reservoir forces it to enter the end 29 of this pipe, whence it passes by way of the grooves 27 and 26 and socket 24 into the lower end of tube 23. From the upper end of this tube it flows through the bore 30 into the closed chamber or space 21 above the journal 20. I have found in practice that a substantial oil pressure is generated in the manner described, and that this pressure being applied against the cap 19 tends to lift the outer spindle, and its load, and to thus relieve the anti-friction bearing assembly from end thrust. In other words, the upper end of the rotating outer spindle practically floats on a film of oil under pressure. The oil then finds its way down around the journal 20 and thence down through the annular space 17ª into the chamber 35, from which it passes through the anti-friction bearing assembly back to the reservoir.

It will be noted that by virtue of the fact that the annular space 17ª is of progressively increasing diameter downwardly, centrifugal force tends to propel the oil along this space and to assist the action of the scoop pipe 28 in causing it to circulate.

In order to facilitate the free flow of oil along the annular wall 32 of the cap 31, I may provide longitudinally extending grooves on the surface of this wall as shown in Figs. 8 and 9.

Also as shown in these figures, I may, if desired, form the wall somewhat tapering, as indicated at 32'.

It will be noted that when the spindle is at rest, the oil 34, standing in the reservoir at some such level as indicated in Fig. 2, provides a liquid seal effectively closing the oil reservoir and shutting off communication between the reservoir and the outside air, thus preventing evaporation and excluding dust. When, however, the spindle begins to rotate, the oil is displaced by centrifugal force and climbs up the inner walls of the reservoir as above described, thus breaking this seal and establishing communication between the inside of the reservoir and the outer air through the passages between 7, 32, and 11, thereby equalizing the pressure in the oil chamber.

In the foregoing, it has been assumed that the whirl always rotates in a direction to force the oil into the open end 29 of the scoop pipe. In some installations, however, it is customary to run the whirl sometimes in one direction and sometimes in another. To take care of this situation, I have devised the modified arrangement shown in Fig. 10. In this figure I have illustrated a second scoop pipe 38 having its open end 39 facing in a direction opposite to the open end 29 of the other pipe. Both of these pipes are set into and carried by a freely movable ring 37 rotatably mounted on the neck 13'. This neck has formed in it a port 40 adapted to register with the inner end of either pipe 28 or 38. The neck also has formed in it a notch 41 in which works a lug 42, carried by the ring 37.

In the position illustrated in the drawings, the parts are set for operation of the pipe 28. When, however, the rotation of the whirl is reversed, the drag on the ring 37 serves to shift it so as to move the lug 42 against the shoulder at the other end of the notch 41, and bring the pipe 38 into registry with the port 40. Thus one pipe or the other serves to scoop up the oil and deliver it to the conduit, in accordance with the direction of rotation of the whirl.

What I claim is:

1. The combination with a fixed spindle, of a rotary hollow spindle journaled thereon and having a bearing adjacent each end thereof, said hollow spindle carrying an oil reservoir at one end, an oil conduit extending longitudinally of said fixed spindle from said reservoir to the bearing at the other end thereof, and means within said reservoir whereby rotation of said hollow spindle serves to force oil into and through said conduit.

2. The combination with a fixed spindle, of a rotary hollow spindle journaled thereon and having a bearing adjacent each end thereof, said spindles being spaced apart throughout their length between said bearings, said hollow spindle carrying an oil reservoir at one end, an oil conduit extending longitudinally of said fixed spindle from said reservoir to the bearing remote therefrom, and means within said reservoir whereby rotation thereof serves to force oil to flow into and through said conduit, and to return to said reservoir through the space between said spindles.

3. The combination with a fixed spindle, of a rotary hollow spindle journaled thereon and having a bearing adjacent each end thereof, said hollow spindle carrying an oil reservoir at one end, an oil conduit extending longitudinally of said fixed spindle from said reservoir to the bearing at the other end thereof, and means within said reservoir whereby rotation thereof serves to force oil to flow from said reservoir through said conduit and thence back through both of said bearings to said reservoir.

4. The combination with a fixed tapered spindle, of a hollow spindle journaled thereon and having a correspondingly tapered interior, whereby an annular space of progressively increasing diameter is provided between said spindles, said hollow spindle having a bearing adjacent each end thereof and carrying an oil reservoir at the larger end, an oil conduit extending longitudinally through said fixed spindle from said reservoir to the bearing remote therefrom, and means for forcing oil to flow from said reservoir through said conduit and return through said annular space of progressively increasing diameter to said reservoir, whereby centrifugal force acting upon the oil in said space tends to cause it to move toward said reservoir.

5. The combination with a fixed vertical spindle, of a rotary hollow spindle journaled thereon and having a bearing adjacent the upper and lower end thereof, said hollow spindle carrying an oil reservoir at the lower end, an oil conduit extending longitudinally of said fixed spindle from said reservoir to the bearing at the upper end thereof, and means whereby oil is caused to flow upwardly through said conduit and to return to said reservoir through both bearings.

6. The combination with a fixed vertical spindle, of a hollow spindle journaled thereon, said hollow spindle having adjacent its lower end a combined radial and thrust bearing, and having a plain cylindrical bearing at its upper end, a closed oil chamber above said plain cylindrical bearing, an oil reservoir, and means operated by the rotation of said hollow spindle for forcing oil from said reservoir into said chamber so as to create an oil pressure in said chamber tending to relieve the end thrust on said bearing at the lower end thereof.

7. The combination with a fixed vertical spindle, of a hollow spindle journaled thereon, said hollow spindle having adjacent its lower end a combined radial and thrust bearing, and having a plain cylindrical bearing at its upper end, a closed oil chamber above said plain cylindrical bearing, said hollow spindle having an oil reservoir at its lower end below said first mentioned bearing, an oil conduit extending longitudinally of said fixed spindle from said reservoir to said closed chamber, and means within said reservoir for forcing oil through said conduit into said chamber so as to create an oil pressure therein tending to relieve end thrust on said first mentioned bearing.

8. The combination with a fixed vertical spindle, of a hollow spindle mounted to rotate thereon, the upper end of said fixed spindle having a cylindrical journal, and a bearing cap with a closed upper end carried by said hollow spindle and fitting said journal, an oil reservoir formed within said hollow spindle at the lower end thereof, an additional bearing between said spindles adjacent said reservoir, and means operated by the rotation of said hollow spindle for forcing oil from said reservoir up into the space between the closed end of said cap and the end of said cylindrical journal so as to build up a pressure in said space tending to lift said hollow spindle.

9. The combination with a fixed vertical spindle, of a hollow spindle mounted to rotate thereon, the upper end of said fixed spindle having a cylindrical journal, and a bearing cap with a closed upper end carried by said hollow spindle and fitting said journal, an oil reservoir formed within said hollow spindle at the lower end thereof, an additional bearing between said spindles adjacent said resorvoir, means within said reservoir below said additional bearing for forcing oil from said reservoir into the space between the closed end of said cap and the end of said journal, so as to create a pressure in said space tending to lift the hollow spindle, and means whereby the oil is returned from said space through both bearings to said reservoir.

10. The combination with a fixed spindle, of a rotary hollow spindle coextensive therewith and journaled thereon and having a bearing adjacent each end thereof, said hollow spindle carrying an oil reservoir at one end, said fixed spindle having a longitudinal groove formed in one side thereof extending between said two bearings, a tube disposed within said groove, and means within said reservoir for forcing oil therefrom through said tube to the bearing at the remote end of said spindles.

11. The combination with a fixed spindle having a cylindrical journal at one end thereof, of a hollow spindle mounted to rotate upon said fixed spindle and having at its end a closed bearing fitting said cylindrical journal, an additional bearing between said spindles adjacent the other end thereof, said cylindrical journal having an axial bore, a tube extending from a point adjacent said additional bearing longitudinally of said fixed spindle, and communicating at its other end with said bore, said hollow spindle having a oil reservoir therein, and means for causing oil to flow under pressure from said reservoir through said tube and bore.

12. The combination with a fixed vertical spindle having a cylindrical journal at the upper end thereof, of a hollow spindle adapted to rotate thereon and having at its upper end a bearing fitting said journal, an additional bearing between said spindles adjacent the lower end thereof, an oil reservoir within the lower end of said hollow spindle, an oil conduit extending inside of said hollow spindle from a point below said additional bearing to said upper bearing, and means within said reservoir below said additional bearing for forcing oil from said reservoir into the lower end of said conduit.

13. The combination with a vertical fixed spindle, of a hollow spindle mounted to rotate thereon, a bearing at the upper end of said spindles, and a bearing adjacent the lower end thereof, said hollow spindle having an oil reservoir therein at a point below said lower bearing, an oil conduit extending longitudinally of said fixed spindle from a point below said lower bearing to said upper bearing, a sleeve member fitting said fixed spindle below said lower bearing and a scoop pipe carried by and extending radially from said sleeve member and communicating with the lower end of said conduit, the outer end of said scoop pipe being in close proximity to the inner wall of said oil reservoir, whereby when said hollow spindle rotates, the oil is caused by centrifugal force to enter said scoop pipe and flow upwardly through said conduit to said upper bearing.

14. The combination with a fixed vertical spindle, of a hollow spindle mounted to rotate thereon, a bearing at the upper end of said spindles, the lower end of said hollow spindle being cylindrical and constituting an oil reservoir, a conduit extending from said reservoir to said bearing, a scoop pipe carried by said fixed spindle and communicating with the lower end of said conduit, the open end of said scoop pipe being disposed in close proximity to the inner wall of said reservoir at a point well above the normal level of oil in said reservoir, whereby centrifugal force, due to rotation of said hollow spindle will cause said oil to climb up the inner wall of said reservoir and enter said scoop pipe, and to thus be forced up said conduit to said bearing.

15. The combination with a fixed vertical spindle, of a hollow spindle mounted to rotate thereon, bearings between said spindles adjacent the upper and lower ends thereof, the lower portion of said hollow spindle constituting an oil reservoir, a cap closing the lower end of said reservoir and having an annular wall encircling but spaced from said fixed spindle and extending to a point above the normal level of oil in said reservoir, whereby the reservoir is rendered oil-tight without contact between moving parts, and means for forcing oil from said reservoir through said bearings, said forcing means being disposed well above the normal level of oil in said reservoir, whereby centrifugal force, due to rotation of the hollow spindle containing said reservoir, will cause the oil to rise along the inner wall thereof until it reaches said forcing means.

16. The combination with a fixed spindle, of a hollow spindle mounted to rotate thereon and having a cylindrical portion at one end constituting a whirl, a bearing between the spindles within the said cylindrical portion, and another bearing between the spindles adjacent the end thereof remote from said cylindrical portion, an oil reservoir, closed at its lower end, formed within and carried by the said cylindrical portion of said hollow spindle and means within said reservoir for forcing oil to and through both of said bearings.

17. In a spindle mounting, the combination with a bearing to be lubricated, a member having an oil reservoir therein mounted for rotation on said bearing, a fixed conduit extending to said bearing, means operated by centrifugal force due to rotation of said member for forcing oil from said reservoir into said conduit, and automatic means for rendering said oil forcing means effective for either direction of rotation.

18. In a spindle mounting, the combination with a bearing to be lubricated, a member having an oil reservoir therein mounted for rotation on said bearing, normally fixed scoop means for picking up oil from the interior of said reservoir, when rotating, and causing it to flow to said bearing, and automatic means for shifting said scoop means to render it effective for either direction of rotation.

19. In a spindle mounting, the combination with a bearing to be lubricated, a member having an oil reservoir therein mounted for rotation on said bearing, a fixed conduit extending to said bearing, a pair of normally fixed, oppositely directed scoop means for picking up oil from the interior of said reservoir, when rotating, and automatic means for establishing communication between said conduit and one or the other of said scoop means, in accordance with the direction of rotation of said member.

20. The combination with a fixed spindle, of a rotary hollow spindle journaled thereon, bearings between said spindles, an annular oil reservoir carried by the lower end of said hollow spindle, and means within said reservoir, which, when said hollow spindle is at rest, cooperates with the oil reservoir to form a liquid seal, preventing communication between said reservoir and the outside air, but which seal is broken by the action of centrifugal force on said oil when said spindle rotates.

RALPH SHIPMAN.